No. 802,159. PATENTED OCT. 17, 1905.
J. L. G. DYKES.
APPARATUS FOR MOLDING RUBBER TIRES AND THE LIKE.
APPLICATION FILED SEPT. 6, 1904.
3 SHEETS—SHEET 1.
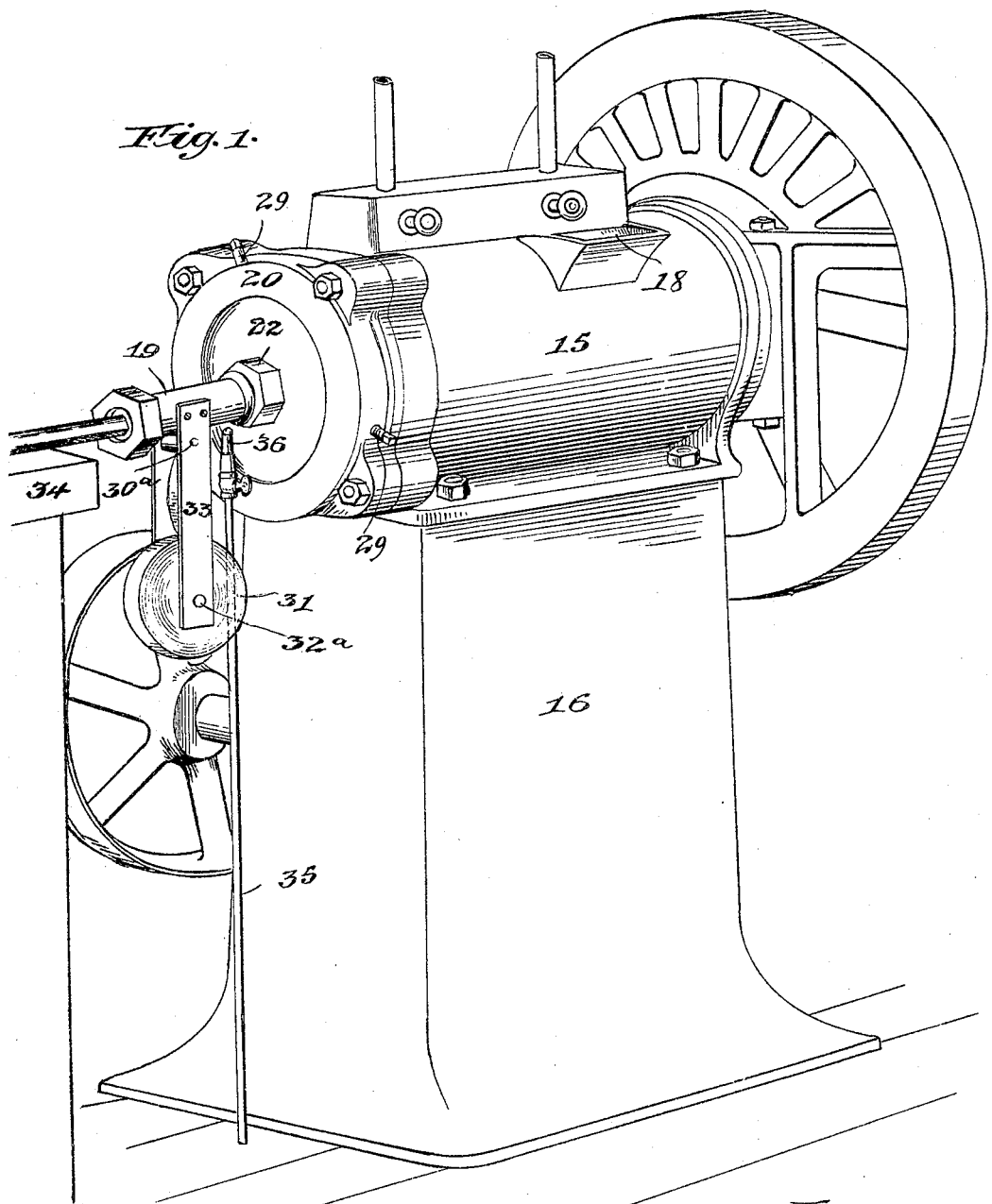

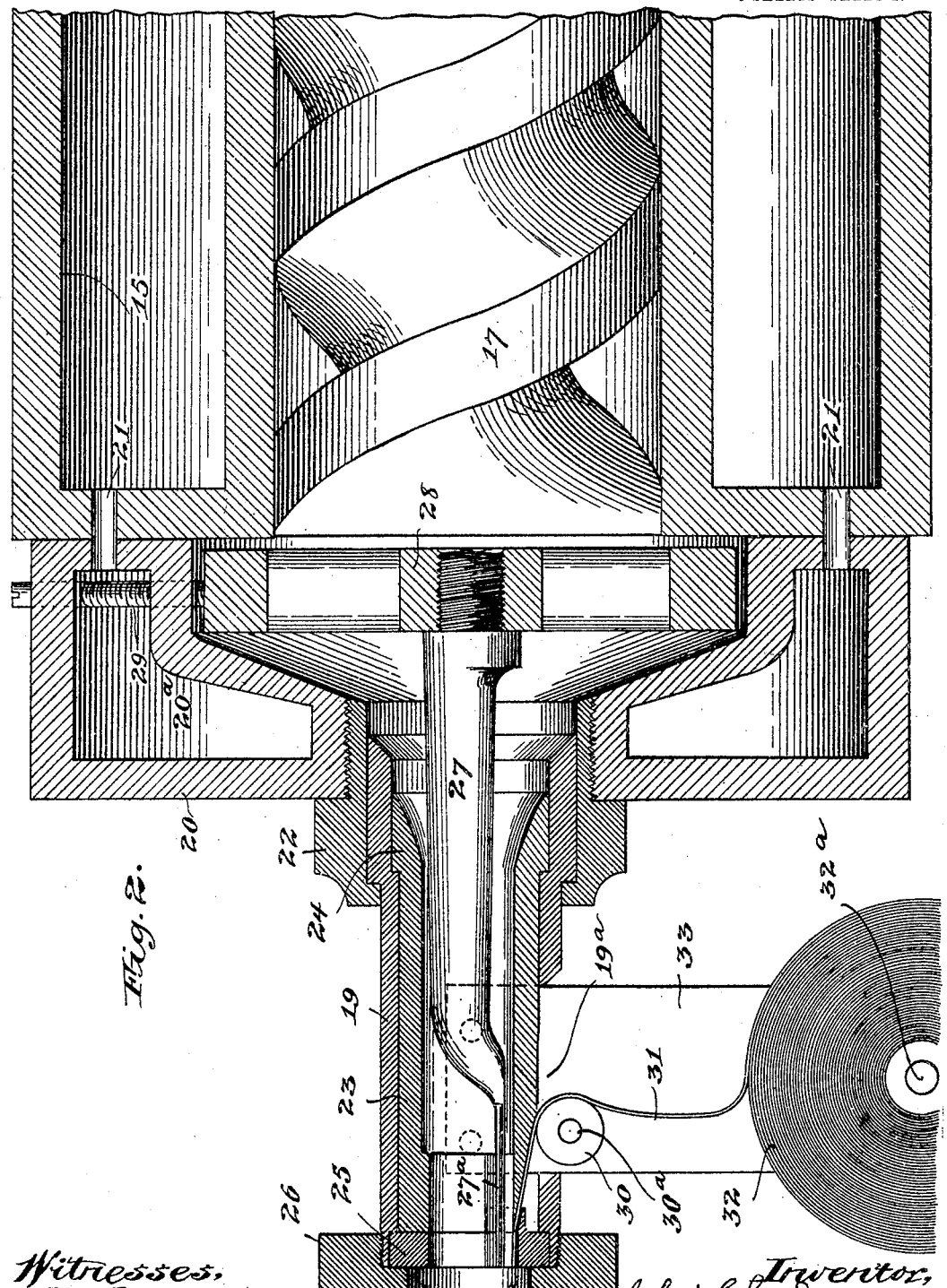

No. 802,159. PATENTED OCT. 17, 1905.
J. L. G. DYKES.
APPARATUS FOR MOLDING RUBBER TIRES AND THE LIKE.
APPLICATION FILED SEPT. 6, 1904.

3 SHEETS—SHEET 3.

UNITED STATES PATENT OFFICE.

JOHN L. G. DYKES, OF CHICAGO, ILLINOIS.

APPARATUS FOR MOLDING RUBBER TIRES AND THE LIKE.

No. 802,159.     Specification of Letters Patent.     Patented Oct. 17, 1905.

Application filed September 6, 1904. Serial No. 223,473.

*To all whom it may concern:*

Be it known that I, JOHN L. G. DYKES, a citizen of the United States, residing at Chicago, county of Cook, and State of Illinois, have invented certain new and useful Improvements in Apparatus for Molding Rubber Tires and the Like, of which the following is a specification.

My invention relates to apparatus for molding rubber tires, tubes, and similar articles, and has reference more particularly to a new and improved means and manner of applying a fabric base or covering thereto.

In the manufacture of rubber vehicle-tires as at present carried out the tire is first molded by squeezing and forcing the plastic raw rubber through a steam-jacketed mold and matrix, and after the desired length of tire has thus been formed and prior to vulcanization a strip of stout canvas or the like is laid over and cemented to the base of the tire, covering the sides of the base, which engage the sides of the usual channeled rim.

My invention has for its prime object to simplify and shorten these operations of molding the tire and subsequently applying the fabric base by combining them in a single operation, thus practically eliminating from the process of manufacture the time and operation represented by the application of the fabric base.

In accordance with my invention I apply to the matrix of the mold a device whereby the strip of canvas may be fed through the matrix simultaneously with and in contact with the base portion of the matrix in such a manner as to adhere to the tire as it emerges from the matrix, thus effecting the molding of the tire and the application of the fabric covering by one and the same operation.

A machine which represents a mechanical embodiment of my invention in the best form which I have hitherto designed is illustrated in the accompanying drawings, wherein—

Figure 5:
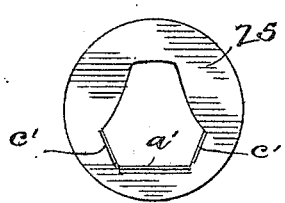
Figure 6:
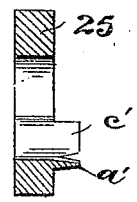
Figure 7:
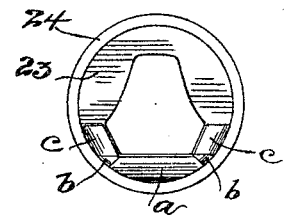
Figure 8:
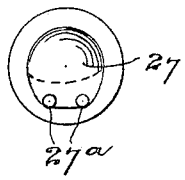
Figure 3:
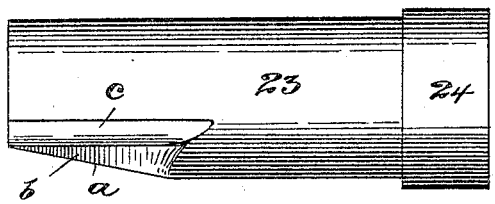
Figure 4:
Figure 9:
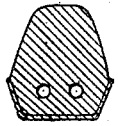
Figure 10:
Figure 11:
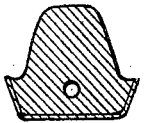

Figure 1 is a perspective elevational view of a tire-forming mold and matrix equipped with my present invention. Fig. 2 is a vertical cross-section, on an enlarged scale, of the discharge end of the mold, including the discharge-nozzle and matrix, having my improvement applied thereto. Fig. 3 is a side elevational view of the delivery-tube. Fig. 4 is a top plan view of a mandrel employed in the manufacture of tires having internal fastening-wires. Figs. 5 and 6 are respectively face and vertical sectional views of the matrix. Fig. 7 is a front end view of the delivery-tube. Fig. 8 is a front end view of the mandrel. Figs. 9 and 10 are respectively cross-sectional and side elevational views of a complete tire molded by the machine, and Fig. 11 is a cross-sectional view of a "side-wire" tire such as may be made by the apparatus of my invention.

Referring to the drawings, 15 designates a steam-jacketed mold of a usual pattern mounted on the pedestal 16 and provided internally with the usual feed-screw 17, which serves to advance and force the material fed into it through a hopper 18 into the discharge-nozzle 19.

Referring to Fig. 2, and more particularly describing the parts of the delivery mechanism, 20 designates a cored nozzle-supporting projection secured to the forward end of the mold-cylinder 15 and having a steam-chamber $20^a$ in connection with the steam-chamber of the mold through ports 21. An internally-flanged collar 22 is secured in the nozzle-support 20 through threaded engagement therewith and itself serves to support a forwardly-projecting sleeve 19, constituting the outer shell of the discharge-nozzle. The sleeve 19 is cut away on its lower side, as indicated at $19^a$, and itself carries a delivery-tube 23, the form of which is more particularly shown in Figs. 3 and 7. This delivery-tube consists of a sleeve having at one end an integral collar 24, snugly fitting a corresponding internal enlargement of the outer sleeve 19 and having a flared bore at its rear end and a somewhat contracted bore at its forward end having the cross-sectional form of the finished tire, as shown in Fig. 7. At its forward end the sleeve 23 is provided on its under side with a series of inclined flat surfaces disposed at angles to each other, the bottom or lower inclined surface being indicated by $a$, the next adjacent inclined surfaces, which are triangular in plan, as shown in Fig. 3, being indicated by $b$, and the upper inclined surfaces lying directly above the series $b$ being indicated by $c$. All of these inclines taper from a point on the outer surface of the tube somewhat inwardly of its outer end to its inner surface, substantially coincident with its outer end. These beveled or inclined surfaces of the delivery-tube 23 are disposed directly above the opening $19^a$ of the outer sleeve of the nozzle. Fitted within the outer end of the sleeve 19 and abutting against an annular shoulder on the end of said sleeve and also against the end of the delivery-tube 23 is a matrix 25, constructed to conform to the cross-sectional outline of the tire to be molded. This matrix, which is more particularly shown in Figs. 5 and 6, has formed on its inner face a series of inwardly-projecting lips $a'$ and $c'$, which when the parts are assembled underlie the forward ends of the inclined surfaces $a$, $b$, and $c$ of the delivery-tube, leaving therebetween a narrow passage-way for the delivery of tape, as hereinafter more particularly described. The matrix may be secured to its seat by a nut 26 engaging the externally-threaded end of the sleeve 19 and having an internal shoulder abutting against the outer face of the matrix 25.

For the manufacture of tires adapted to be secured by one or more internal fastening-wires I employ, as usual in this class of machines, a mandrel for the formation of the necessary holes in the tire to accommodate said wires. Such a mandrel is herein shown at 27, being supported at its inner end in a spider 28, which is supported and adjusted by means of set-screws 29, passed through the nozzle-support 20 and engaging the periphery of the spider. The forward end of the mandrel includes a pair of prongs $27^a$, adapted to the formation of a tire having a pair of internal fastening-wires. These prongs $27^a$ extend through the matrix, being supported in a position slightly above the base of the latter.

In or directly beneath the opening $19^a$ of the sleeve 19 is suitably mounted a guide-roller 30, disposed transversely of the nozzle and serving to guide and support a fabric strip or tape 31, delivered from an underlying reel or spool 32. Any suitable means may be employed for supporting the guide-roller and spool in proper positions, the means herein shown for that purpose consisting of a depending bracket 33, secured at its upper end to the sleeve 19 and having the guide-roller and spool mounted on spindles $30^a$ and $32^a$, projecting laterally therefrom.

34 designates a table, platform, or other suitable support disposed in front of the matrix and adapted to receive and support the product in the manner clearly indicated in Fig. 1.

35 designates a gas-pipe having a burner 36 disposed directly beneath the under side of the sleeve 19 somewhat in rear of the guide-roller 30, the function of said burner being to heat the delivery-tube and matrix sufficiently to insure a free and uniform flow of the plastic material therethrough. In some cases the flow of the material will be sufficiently uniform and free without the use of such auxiliary heating means, in which case the latter can be dispensed with.

In the operation of the machine the rubber stock is fed into the hopper 18, steam being turned on through the the steam-chambers of the mold to heat the same and power being applied to the shaft of the feed-screw 17. By this means the material is fed forward uniformly in a soft and plastic condition, being forced through the openings of the spider 28 and thence into the receiving end of the discharge-nozzle, entering the flaring end of the delivery-tube 23 around the stem or shank of the mandrel 27. As it passes on to the forward end of the delivery-tube it forms a solid mass at the latter, with the exception of the space occupied by the mandrel-rod $27^a$, assuming in the forward end of the delivery-tube and the matrix 25 the cross-sectional form of the tire in its finished condition. Previous to the discharge of stock through the matrix the tape or strip 31 is carried upwardly over the guide-roller 30, through the narrow passage between the overlapping lips of the delivery-tube and matrix, and through the latter, so that the stock as it enters and passes through the matrix is forced into intimate contact with the strip or tape, the latter overlying those sides of the matrix which form the base and outwardly-inclined base sides of the tire. This contact having been established, the tire as it advances through the matrix onto the table or support 34 automatically picks up and carries with it, snugly adhered thereto, the fabric strip or tape, the latter being gradually unwound from the spool 32 as it is thus used. I have found by actual test that a fabric base may be applied in this manner to the rubber tire during the molding opertion without in the least impairing the quality or structure of the tire itself and without involving any delay in the molding operation, from which it will be seen that my invention entirely saves the time and labor which is now required in the subsequent application of the fabric base. Aside from this it effects an economy in that it dispenses with the loss of waste ends, which now require to be cut off and discarded under the present method of applying the base.

While I have described my machine as formed for the application of a fabric base to a rubber tire, yet it will be readily understood that the same principle of operation may be advantageously employed for the application of a fabric covering to a tube or hose. This would require merely a circumferential enlargement or extension of the passage-way between the end of the delivery-tube and the matrix and such a modification in the peripheral form of the roller 30 as would serve to guide and support a strip of sufficient width to form such a surface-covering.

It is evident that the machine as herein shown and described might be considerably modified in respect to details of form, construction, and relative disposition of parts without altering the real character of the invention or departing from the principle or spirit thereof. Hence I do not limit the invention to the particular mechanical embodiment thereof herein illustrated and described except to the extent indicated in specific claims.

I claim—

1. In an apparatus for molding rubber tires and the like, the combination with a mold having a laterally-apertured delivery-nozzle and means for forcing plastic material therethrough, of means for guiding and directing a covering-strip of non-plastic material drawn through said aperture by frictional contact with the surface of said plastic material as the latter is expressed through said delivery-nozzle, substantially as described.

2. In an apparatus for molding rubber tires and the like, the combination with a mold having a delivery-nozzle provided with a matrix in its forward end and having a transverse aperture formed therein in rear of said matrix, of means for guiding and directing a covering-strip through said aperture and the matrix in contact with the rubber delivered by the latter, substantially as described.

3. In an apparatus for molding rubber tires and the like, the combination with a mold having a delivery-nozzle provided with a matrix in its forward end and having a transverse aperture formed therein in rear of said matrix, of guide-walls between said aperture and matrix so shaped and disposed as to form between them a guide-slot for the passage of a covering strip or tape to and through the matrix, substantially as described.

4. In an apparatus for molding rubber tires and the like, the combination with a mold having a delivery-nozzle provided with a matrix in its forward end and having a transverse aperture formed therein in rear of said matrix, of guide-walls between said aperture and matrix so shaped and disposed as to form between them a guide-slot for the passage of a covering strip or tape to and through the matrix, and a guide-roller for said strip mounted across said aperture, substantially as described.

5. In an apparatus for molding rubber tires and the like, the combination with a mold having a laterally-apertured delivery-nozzle, of means for guiding and directing a fabric covering strip or tape drawn through said aperture by frictional contact with the surface of said plastic material as the latter is expressed through said delivery-nozzle, and means for heating the latter, substantially as described.

6. In an apparatus for molding rubber tires and the like, the combination with a mold having a laterally-apertured delivery-nozzle containing a mandrel, and means for forcing the plastic material therethrough, of means for guiding and directing a covering-strip of non-plastic material drawn through said aperture by frictional contact with the surface of said plastic material as the latter is expressed through said delivery-nozzle around said mandrel, substantially as described.

JOHN L. G. DYKES.

Witnesses:
SAMUEL N. POND,
FREDERICK C. GOODWIN.